3,373,180
PURIFICATION PROCESS
John Arnold Glass, Texas City, Tex., and Wilbert H. Urry, Chicago, Ill., assignors to Monsanto Company, St. Louis, Mo., a corporation of Delaware
No Drawing. Filed June 22, 1966, Ser. No. 559,420
11 Claims. (Cl. 260—450)

The present invention relates to a method for the purification of fluid streams. More particularly, the present invention relates to the removal of iron carbonyl impurities from fluid streams.

The products of many reactions contain iron carbonyls as impurities, especially those reactions conducted wherein carbon monoxide is a reactant. This is due to the reaction of any iron present during the reaction either in the catalysts or the reactor system itself with carbon monoxide to produce the iron carbonyl, which include iron pentacarbonyl, iron tetracarbonyl, and iron nonacarbonyl. Iron pentacarbonyl is the most frequently occurring of the iron carbonyls and the present invention is particularly useful in the removal of iron pentacarbonyl. The reaction of mixtures comprising carbon monoxide and hydrogen is used to produce many different products. For example, the reaction of carbon monoxide with hydrogen or the reaction of a mixture of carbon monoxide and carbon dioxide with hydrogen may be used for the production of methanol or may be used to produce higher alcohols, hydrocarbons, ketones, and aldehydes according to the well-known Fischer-Tropsch synthesis. The Fischer-Tropsch synthesis is particularly adapted to the production of hydrocarbon compounds such as gasoline. The reaction of carbon monoxide and hydrogen in the presence of olefins according to the well-known Oxo synthesis produces a final product which is frequently a mixture of alcohols of various molecular weights and isomeric configurations as well as ketones and aldehydes. The Oxo synthesis may be accomplished in either a one-step reaction or, as is more generally practiced, in a two-step process. In all of these well-known processes where a mixture comprising carbon monoxide and hydrogen is reacted, iron carbonyls are usually present as impurities.

It is therefore an object of the present invention to provide a process for the purification of streams containing iron carbonyl as an impurity. Another object of the present invention is to provide a process for the removal of iron carbonyl impurities from the reaction products produced by reacting a mixture comprising carbon monoxide and hydrogen. A particular object of the present invention is to provide a process for the removal of iron carbonyl from alcohols. Additional objects will become apparent from the following description of the present invention.

The present invention in one of its embodiments comprises a process for the removal of iron carbonyl impurities from streams containing said iron carbonyls as impurities which comprises passing said stream through a resin bed, said resin bed having been prepared by replacing at least a portion of the replaceable cations in a cation exchange resin with ferric ions.

As the stream containing the iron carbonyl impurities is passed through the bed, an oxidation-reduction reaction takes place wherein the ferric ions retained on the resin bed are reduced to ferrous ions, and the iron in the iron carbonyl is oxidized to the ferrous state. The iron which has been oxidized to the ferrous ion is retained in the resin bed while the carbon monoxide produced in the oxidation-reduction reaction passes out of the bed with the fluid which is being purified. The carbon monoxide can then be removed from the fluid in a conventional manner. If the fluid which is being purified is a liquid, then most of the CO will go off as a gas.

The resins useful in the present invention may be prepared by passing an aqueous solution of a ferric salt through a cation exchange resin bed so as to replace the cations in the cation exchange resin with ferric ions. The cations replaced by the ferric ions will generally be either sodium ions or hydrogen ions. Generally, an aqueous solution of ferric chloride will be used; however, aqueous solutions of almost any soluble ferric salt may be used. Some nonlimiting examples of suitable ferric salts include ferric sulfate, ferric nitrate, ferric bromide, ferric dicromate, ferric fluoride, ferric citrate, and ferric oxalate. The aqueous solution of the ferric salt will generally be passed through the cation exchange resin bed at a temperature of from 0° C. to 120° C. and at the pressure which is sufficient to keep the aqueous solution in the liquid phase, which pressure will generally be at or about atmospheric pressure. The flow rate of the aqueous solution of the ferric salt through the bed may vary over wide limits, usually ranging from about $\frac{1}{20}$ gallon per cubic foot of bed per minute and lower to about 4 gallons per cubic foot of bed per minute and higher. Naturally, the faster the flow through the bed, the faster the replaceable cations therein will be replaced with ferric ions. Not all the replaceable ions need be replaced with ferric ions in order to practice the present invention; however, it is obvious the fewer the number of ferric ions that are retained on the bed then the sooner the bed will require regeneration.

When the resin beds of the present invention have been exhausted, they may be regenerated by passing a 10% hydrogen chloride or sulfuric acid solution through the bed followed by passing an aqueous solution of a ferric salt through the bed.

The cationic ion exchange resins used for the preparation of the resin beds useful in the present invention may be either a weak acid cation exchange resin, an intermediate acid cation exchange resin, or a strong acid cation exchange resin; however, the strong acid cation resins are preferred. Cation exchange resins are high molecular weight polyacids which are virtually insoluble in aqueous and most non-aqueous media. The acids which constitute the exchange groups of the cation exchange resins useful in the present invention may be either strong acid groups, intermediate acid groups or weak acid groups. The strong acid groups will generally be nuclear sulfonic or methylene sulfonic, which are the preferred groups for the practice of the present invention, while the weak acid groups will be carboxylic acid or phenolic hydroxyl groups. The intermediate acid groups are generally phosphonic, phosphonous, or phosphoric. The cation exchange resins are generally prepared by first forming an insoluble, infusible polymer matrix into which active acidic groups can be introduced by appropriate chemical action. However, a few resins are made by a one-step condensation. The preferred cation exchange resins have a matrix of cross-linked polystyrene such as a copolymer of a major proportion of styrene and a minor proportion of divinylbenzene and/or ethylvinylbenzene. Compounds such as isoprene or butadiene may also be used as cross-linking agents. Such a cross-linked polystyrene matrix may be converted to a strong acid exchange resin by sulfonation. Also, many cation exchange resins are based upon matrices which are phenol-formaldehyde condensates. Most of the weak acid cation exchange resins are carboxylic resins which are generally made by copolymerizing an acid such as acrylic acid or methacrylic acid with a cross-linking agent such as divinylbenzene. The carboxylic cation exchange resins may also be made by hydrolyzing a cross-linked polymer of an ester such as acrylic acid ester.

The cation exchange resins useful in the present invention may be of various sizes and shapes. Generally those having a cross-linked styrene polymer matrix are in the form of beads, while those having a matrix of a phenol-formaldehyde condensate are granular. Those cation exchange resins having a matrix formed from an acid such as acrylic acid or its ester are also usually in the form of beads. The mesh size will generally be between about 10 and 70 mesh although the present invention is not limited to any particular mesh size.

The temperature at which the process of the present invention is operated may vary over a relatively wide range. The lower temperature limit, of course, is limited by the kinetics of the reaction between the iron carbonyl impurities and the ferric ion which has been retained in the cationic exchange resin bed. Higher temperatures favor this reaction; however, the decomposition temperature of the particular cation exchange resin being used must not be exceeded. For most cation exchange resins, this decomposition temperature will be around 120° C. It is preferred to operate the present invention at a temperature of at least 0° C. and not above 120° C., particularly in the range of about 10° C. to about 70° C.

The iron carbonyl containing streams which are to be purified may be passed through the resin bed of the present invention either as a gas or as a liquid. Usually, the impure streams containing iron carbonyls will be in the liquid phase. In practicing the present invention with respect to the purification of alcohols, it is preferred that the alcohols be liquid.

The pressures which may be used in the present invention may vary from atmospheric pressure or lower up to pressures of several atmospheres, i.e., 15 atmospheres and higher. Generally, pressures at or near atmospheric pressure are employed unless a higher pressure is desired in order to keep the stream being purified in the liquid phase. For example, in the purification of methanol, pressures of above one atmosphere might be used if the temperature of the process of the present invention is above the boiling point of methanol.

In operating the process of the present invention, the flow rate of the iron carbonyl-containing stream to be purified through the resin bed is a matter of choice provided the load limits of the bed are not exceeded. For example, the flow rate through the bed may vary from 1/20 gallon per cubic foot of bed per minute to about four gallons per cubic foot of bed per minute. The maximum flow rate through the bed will, of course, vary with the size of the particular resin being used but will usually be within the above ranges.

Practically any stream containing iron carbonyls as impurities may be purified according to the present invention; however, a strongly acid medium could not be purified nor could one which is high in sodium content since the ferric ions would be removed from the resin. Most frequently such iron carbonyl-containing streams are those resulting from the reaction of a mixture comprising carbon monoxide and hydrogen wherein iron is present in the catalyst and/or the reactor surfaces. The present invention is particularly useful in the purification of alcohols having from 1–15 carbon atoms containing iron carbonyls as impurities. Among the alcohols which may be purified are ethanol, isopropylalcohol, n-butanol, the octanols, the decanols, 1-dodecanol, tridecanol, and 1-pentadecanol. In its preferred utilization, the process of the present invention is used for the removal of iron carbonyls from methanol. The alcohols which may be purified according to the present invention are not limited to those produced by the reaction of a mixture comprising carbon monoxide and hydrogen.

The following example is given to illustrate but not to limit the present invention.

*Example 1*

A resin bed was prepared by filling a 1-inch diameter tube to a depth of 16 inches with a nuclear sulfonic acid cationic exchange resin known as Amberlite IR–200. This cation exchange resin had a matrix which was a styrene-divinyl benzene copolymer and was in the form of beads which were between 20 and 70 mesh in size. A 10 percent aqueous solution of ferric chloride was passed through the bed at a rate of 0.30 to 0.36 gallon per cubic foot per minute at about 25° C. and atmospheric pressure in order to replace the replaceable hydrogen ions of the exchange resin with ferric ions. Methanol which had been prepared by reacting CO with $H_2$ in the presence of a catalyst at about 375° C. and which contained about 80 parts per billion iron pentacarbonyl was then passed through the bed at a rate of about 0.30 to 0.36 gallon per cubic foot per minute and at a temperature of about 250 C. The effluent from the bed contained less than one part per billion iron pentacarbonyl.

*Example 2*

A resin bed was prepared in the same manner as that in Example 1 and 1-dodecanol containing about 100 parts per billion iron pentacarbonyl is passed through the bed at a rate of about 2 gallons per cubic foot per minute and at about a temperature of 30° C. The effluent from the bed is substantially free of iron pentacarbonyl.

After passing the product to be purified through the cation exchange resin bed on which the ferric ions are retained, it will generally be desirable to pass the product through a second resin bed which is comprised of a cation exchange resin. Although this is not necessary in order to practice the present invention, such a second resin bed will act as a buffer to pick up any iron bleeding through the first bed. The second bed can be in a different structure from the first bed or the two beds can be in contact with each other in the same structure. The cation exchange resin used in the second bed is preferably the same as that used to produce the resin bed on which the ferric ions are retained, however a different cation exchange resin can be used.

The present invention is not to be construed as being limited to the purification of streams containing iron carbonyls as the only impurities. The present invention is especially useful for the removal of amines. The amines are basic and, therefore, when a stream containing these amines is passed through the resin bed, an amine salt is formed which is retained on the resin. The formation of amine impurities occurs frequently, especially in the production of alcohols, when a synthesis gas contains some nitrogen. Some amines which may be formed are methylamine, dimethylamine, trimethylamine, propylamine, butylamine, etc.

Also, in the production of alcohols where minor amounts of ketones and aldehydes are present, the cation exchange resin in the ferric state will catalyze a reaction between the alcohols and the carbonyl compounds to form the corresponding acetals and ketals of those carbonyl compounds. This is advantageous as the ketals and acetals are less subject to oxidation than the ketones and aldehydes and therefore increases the permanganate time of the alcohols. Some frequently occurring ketones and aldehydes are isobutyraldehyde, butanone-2, acetone, propionaldehyde, formaldehyde, and the like.

What is claimed is:

1. A process for the removal of iron carbonyl impurities from an alkanol stream containing such impurities, said alkanol having from 1 to 15 carbon atoms, which process comprises passing said stream at a temperature of from about 0° C. to about 120° C. through a resin bed, said resin bed having been prepared by replacing at least a portion of the replaceable cations in a cation exchange resin with ferric ions.

2. The process of claim 1 wherein said alkanol stream is a reaction product of a mixture comprising carbon monoxide and hydrogen.

3. The process of claim 1 wherein said stream containing iron carbonyl impurities is a methanol stream.

4. The process of claim 1 wherein said iron carbonyl impurities comprise principally iron pentacarbonyl.

5. The process of claim 1 wherein the effluent from said resin bed is passed through a second bed comprising cation exchange resin.

6. The process of claim 1 wherein said replaceable cations are hydrogen ions.

7. The process of claim 1 wherein the temperature is from about 10° C. to about 70° C.

8. The process of claim 7 wherein the pressure is sufficient to keep said stream containing iron carbonyl impurities in the liquid phase.

9. The process of claim 1 wherein said cation exchange resin is a strong acid cation exchange resin.

10. The process of claim 9 wherein said cation exchange resin is a sulfonated cation exchange resin.

11. The process of claim 9 wherein said cation exchange resin has a matrix comprising cross-linked polystyrene.

References Cited

Germany (Landgraf et al.) 1,101,383, March 1961 (2 pp. spec.) 260-643.

Amberlite: IRC-50, October 1962, Rohm & Haas Co., pp. 1-9.

LEON ZITVER, *Primary Examiner.*

H. MARS, *Assistant Examiner.*

UNITED STATES PATENT OFFICE
CERTIFICATE OF CORRECTION

Patent No. 3,373,180                          March 12, 1968

Arnold Glass et al.

It is certified that error appears in the above identified patent and that said Letters Patent are hereby corrected as shown below:

Column 1, line 18, "carbonyl" should read -- carbonyls
    Column 2, line 10, "dicromate" should read -- dichromate
    Column 4, line 12, "250 C." should read -- 25° C. --.

Signed and sealed this 26th day of August 1969.

(SEAL)
Attest:

Edward M. Fletcher, Jr.                      WILLIAM E. SCHUYLER, JR.
Attesting Officer                              Commissioner of Patents